United States Patent [19]

Ayuta et al.

[11] Patent Number: 5,185,837
[45] Date of Patent: Feb. 9, 1993

[54] OPTICAL FIBER CONNECTOR INCLUDING FLEXIBLE FIBER HOLDING UNIT

[75] Inventors: Tokuichi Ayuta; Shigeo Takahashi; Takao Hirose, all of Tokyo, Japan

[73] Assignee: Daiichi Denshi Kogyo Kabushiki Kaisha, Japan

[21] Appl. No.: 870,895

[22] Filed: Apr. 20, 1992

[30] Foreign Application Priority Data

Apr. 23, 1991 [JP] Japan .................. 3-037067[U]

[51] Int. Cl.⁵ .................................................. G02B 6/26
[52] U.S. Cl. ................................................ 385/81; 385/83
[58] Field of Search ................ 385/65, 81, 83, 56, 385/57, 76, 77, 62

[56] References Cited

U.S. PATENT DOCUMENTS

| | | | |
|---|---|---|---|
| 4,101,198 | 7/1978 | Heldt | 385/81 X |
| 4,155,624 | 5/1979 | Logan et al. | 385/65 X |
| 4,355,862 | 10/1982 | Kock | 385/81 X |
| 4,477,146 | 10/1984 | Bowen et al. | 385/81 X |
| 4,674,833 | 6/1987 | Des Forges et al. | 385/81 X |
| 4,679,895 | 7/1987 | Huber | 385/81 X |
| 4,696,537 | 9/1987 | Bauer et al. | 385/81 X |
| 4,728,171 | 3/1988 | Schofield et al. | 385/81 X |
| 4,810,053 | 3/1989 | Woith | 385/83 |
| 5,080,460 | 1/1992 | Erdman et al. | 385/81 |
| 5,115,484 | 5/1992 | Johnson | 385/72 |

FOREIGN PATENT DOCUMENTS

| | | | |
|---|---|---|---|
| 57-157211 | 9/1982 | Japan | 385/81 X |
| 62-83709 | 4/1987 | Japan | 385/81 X |

Primary Examiner—Brian Healy
Attorney, Agent, or Firm—Silverman, Cass & Singer, Ltd.

[57] ABSTRACT

An optical connector includes a cylindrical front body formed with a center bore having a front cylindrical bore, a rear cylindrical bore and a tapered bore therebetween. A fiber holding unit made of a flexible material is separable into two parts, whose mating surfaces are formed with grooves for holding an optical fiber and at front and rear portions with spacers for partially preventing contact between the mating surfaces in the proximity of the spacers. The two assembled parts form cylindrical outer surfaces at front and rear ends and a tapered outer surface between the cylindrical outer surfaces. The two assembled parts with the optical fiber interposed therebetween are able to be fitted in the front body from its rear end. A rear body has a front end to be threadedly engaged in the rear end of the front body to urge forwardly the two assembled parts inserted into the front body, thereby clamping the optical fiber between the parts of the fiber holding unit by a wedge effect owing to the tapered surfaces of the front body and the fiber holding unit.

7 Claims, 4 Drawing Sheets

FIG_1a
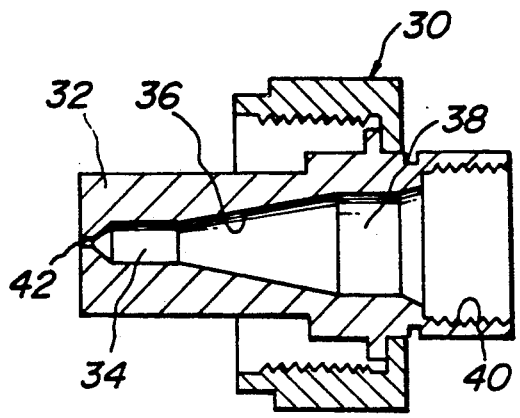
FIG_1b
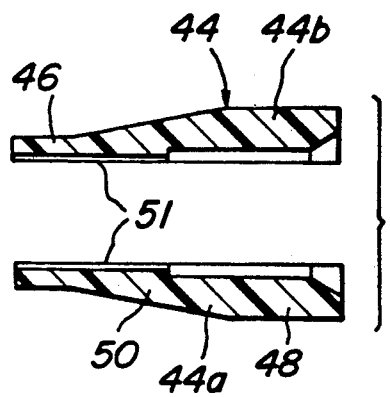
FIG_1c
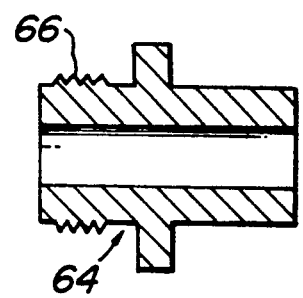
FIG_1d
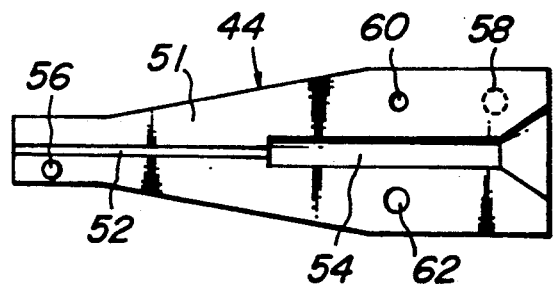
FIG_1e
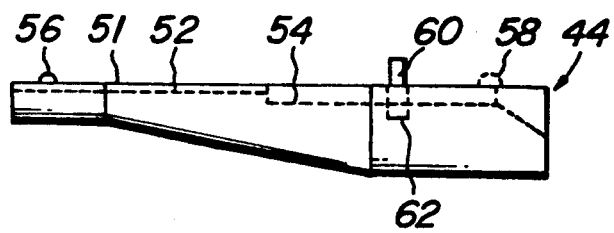

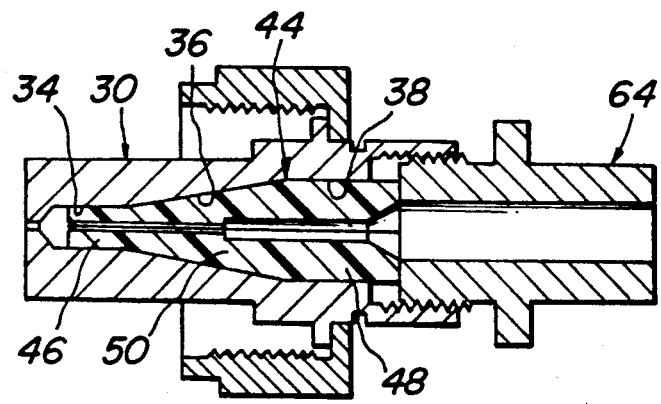
FIG_2
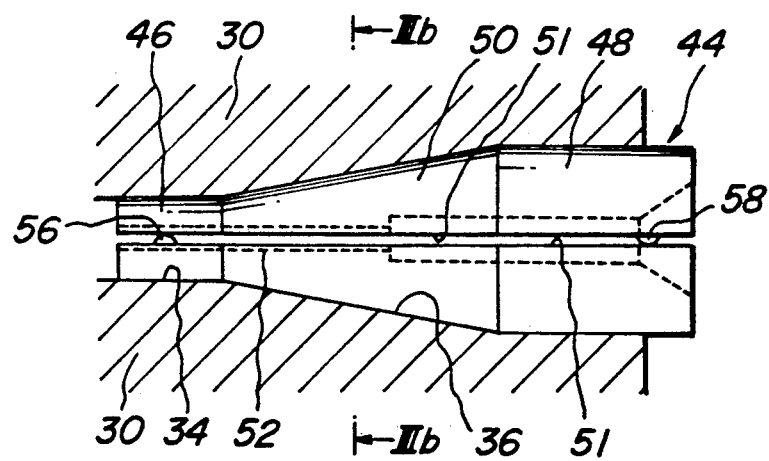
FIG_3a
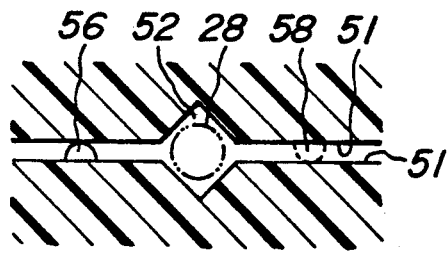
FIG_3b

FIG._6a
PRIOR ART
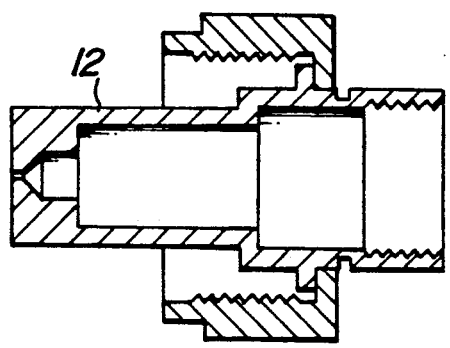
FIG._6b
PRIOR ART
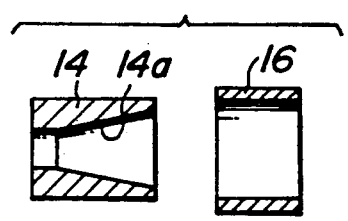
FIG._6c
PRIOR ART
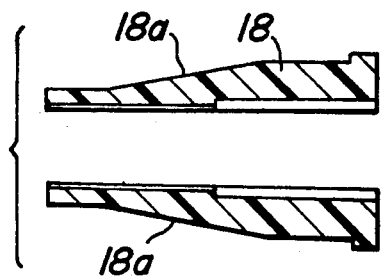
FIG._6d
PRIOR ART
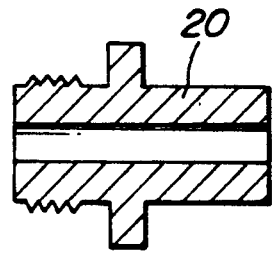
FIG._7
PRIOR ART
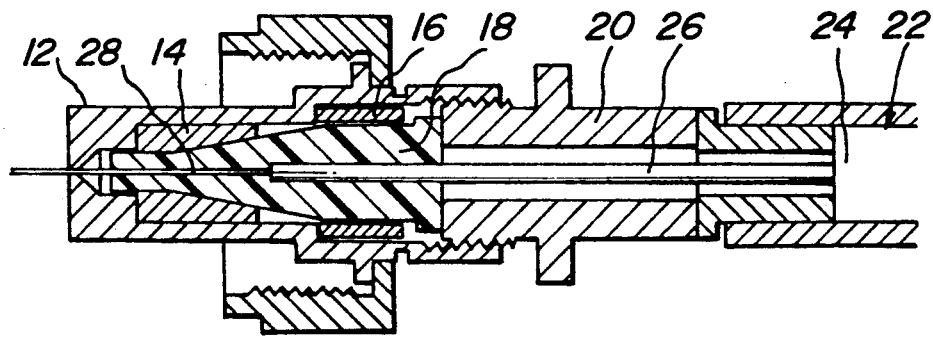

OPTICAL FIBER CONNECTOR INCLUDING FLEXIBLE FIBER HOLDING UNIT

BACKGROUND OF THE INVENTION

This invention relates to an optical connector, and more particularly to an optical connector which is able to be assembled without requiring any adhesion.

An optical connector shown in FIGS. 6a–6d has been known. The known optical connector includes five parts, as a front body 12 (sometimes called "ferrule"), a conical sleeve 14 having an internal tapered surface 14a, a sleeve 16, fiber holding members 18 having externally tapered surfaces 18a and a rear body 20.

An optical fiber cord 22 includes a sheath 24, a coated or covered portion 26 and an optical fiber 28 as shown in FIG. 7. The optical fiber cord 22 is incorporated in the optical connector in the following manner.

The rear body 20 is arranged on the covered portion 26 of the optical fiber cord 22. The front portion of the covered portion 26 and the exposed part of the optical fiber 28 adjacent to the covered portion 26 are then embraced by the fiber holding members 18, onto which the sleeve 16 and the conical sleeve 14 are then fitted. Thereafter, the forward end of the thus assembled parts including the optical fiber cord 22 is inserted into the front body 12. The rear body 20 is then strongly screwed into the rear end of the front body 12. As a result, the optical fiber 28 is securely embraced by the fiber holding members 18 owing to a wedge effect resulting from the tapered surfaces 14a and 18a of the conical sleeve 14 and the fiber holding members 18.

The known optical connector described above suffers several disadvantages from the fact that it has numerous parts. What is worse still, the front body 12, the fiber holding members 18 and the rear body 20 cannot be preassembled and must be separately stored before an optical fiber is incorporated in the optical connector. Consequently, these parts are likely to be lost or disappear so that the known optical connector is disadvantageous in management, storage, packaging and transportation. Moreover, it is difficult for a known optical connector to lower the manufacturing cost. Further, operations for assembling and connecting the known connector are difficult and time-consuming and require great skill.

SUMMARY OF THE INVENTION

It is an object of the invention to provide an improved optical connector which eliminates all the disadvantages of the prior art and which is relatively simple and inexpensive to manufacture and able to be assembled in a short time and is easy to maintain in parts before assembly.

In order to accomplish this object, the optical connector according to the invention comprises a generally cylindrical front body having inner surfaces partially tapered, a fiber holding unit made of a flexible material consisting of two parts whose mating surfaces are formed along their centers with grooves for holding an optical fiber and formed at front and rear portions with spacers for partially preventing intimate contact between the mating surfaces in the proximity of the spacers, the two assembled parts of the fiber holding unit forming cylindrical outer surfaces at front and rear ends and a tapered outer surface between the cylindrical outer surfaces so that the two assembled parts with the optical fiber interposed therebetween are able to be fitted in the front body, and a rear body having a front end to be threadedly engaged in the rear part of the inner surface of the front body to urge forwardly the two assembled parts inserted into the front body, thereby clamping the optical fiber between the parts of the fiber holding unit by a wedge effect owing to the tapered surfaces of the front body and the fiber holding unit.

According to the invention, it is possible to preassemble the respective parts in the provisionally assembled state in that the fiber holding unit is arranged in the front body and the rear body is then slightly threadedly engaged with the rear end of the front body. In the provisionally assembled state, the mating surfaces of the parts of the fiber holding unit are slightly spaced without contacting each other owing to the spacers provided on the mating surfaces. Therefore, the space between the grooves formed in the mating surfaces is sufficient to allow an optical fiber to pass therethrough. The optical connector in the provisionally assembled state can be easily handled during shipment and in storage without any risk of losses of the respective components.

In incorporating into the provisionally assembled connector an optical fiber cord including an optical fiber whose front end is exposed from it sheath, the optical fiber cord is inserted into the connector from its rear end. The rear end body is then further screwed into the rear end of the front body so that the parts of the fiber holding unit are forced forward into the front body so as to be radially inwardly pressed by radially inward forces owing to a wedge effect resulting from the tapered surfaces of the front body and the fiber holding unit. As a result, the parts of the fiber holding unit made of the flexible material are partially deformed so that the mating surfaces of the parts of the fiber holding unit are partially brought into contact with each other to securely clamp the optical fiber in the grooves of the optical fiber holding unit.

The invention will be more fully understood by referring to the following detailed specification and claims taken in connection with the appended drawings.

BRIEF DESCRIPTION OF THE DRAWINGS

FIG. 1a is a sectional view of a front body of the optical connector according to the invention;

FIG. 1b is a sectional view of two parts of a fiber holding unit of the optical connector according to the invention;

FIG. 1c is a sectional view of a rear body of the optical connector according to the invention;

FIG. 1d is a plan view of the lower part of the fiber holding unit of the optical connector viewed in FIG. 1b;

FIG. 1e is a side view of the lower part of the fiber holding unit shown in FIG. 1d;

FIG. 2 is an explanatory sectional view illustrating the provisionally assembled optical connector according to the invention;

FIG. 3a is an enlarged explanatory view illustrating the fiber holding unit shown in FIG. 2;

FIG. 3b is a sectional view taken along the line IIIb—IIIb in FIG. 3a;

FIG. 5b is a sectional view taken along the line Vb—Vb in FIG. 5a;

FIGS. 6a, 6b, 6c and 6d are sectional views illustrating respective parts of an optical connector of the prior art; and FIG. 7 is a sectional view illustrating the assembled optical connector shown in FIGS. 6a-6d.

DESCRIPTION OF THE PREFERRED EMBODIMENTS

Figure 4:
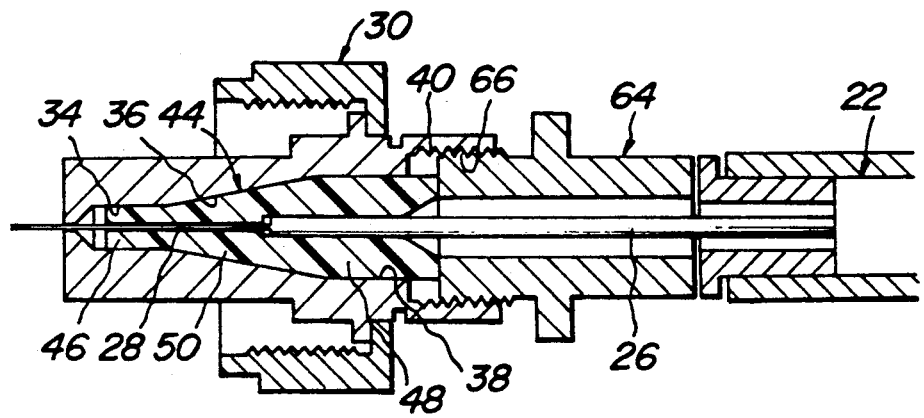
FIG. 4 is an explanatory sectional view of the connector shown in FIG. 2 which has been completely assembled.

Referring to FIGS. 1a to 1e, an optical connector according to one embodiment of the invention comprises a front body 30 including a generally cylindrical main body 32 formed therein with a front cylindrical bore 34, a tapered bore 36 and an enlarged cylindrical bore 38 and at the rearmost end with an internally threaded bore 40. Moreover, the main body 32 is formed at its front end with a fine aperture through which an optical fiber 28 passes.

The optical connector further comprises a fiber holding unit 44 which is separable into two parts 44a and 44b. These parts 44a and 44b have particular features later described by referring to FIGS. 1d and 1e, although they look similar to those of the prior art optical connector. When the two separable parts 44a and 44b are gathered together with their mating surfaces being in opposition to each other, they form a front small cylindrical portion 46, a rear large cylindrical portion 48 and a tapered portion 50 therebetween. The separable parts 44a and 44b of the fiber holding unit 44 with their mating surfaces being in opposition to each other are able to be inserted into the center bores 34, 36 and 38 of the front body 30.

The lower part 44a of the fiber holding unit 44 is shown on a slightly enlarged scale in FIG. 1e and its mating surface is shown in FIG. 1d. The mating surface 51 of the part 44a is formed along its center with a V-shaped groove 52 for receiving the optical fiber 28 and a groove 54 having a semicircular cross-section for receiving a sheath 26 of the optical fiber 28. It is of course that the upper part 44b is formed with a V-shaped groove 52 and a groove 54 for the same purpose. The mating surface 51 is further formed with a spacer 56, for example, a small hemispherical projection on the left side of the V-shaped groove 52 in the front portion of the surface 51 in the embodiment shown in FIG. 1d.

Likewise, the mating surface 51 of the other part 44b is formed with a spacer 58 which is located, for example, on the right of the groove 54 in the rear portion of the part 44b. The position of the spacer 58 of the part 44b is imaginarily illustrated by broken lines on the part 44a in FIGS. 1d and 1e. Although the spacers 56 and 58 are provided on the parts 44a and 44b, respectively, in the shown embodiment, they may be provided on either of the parts 44a and 44b. Reference numeral 60 denotes a dowel to be fitted in an aperture 62 for positioning the two parts 44a and 44b relative to each other. It is preferable to provide two sets of dowels and dowel apertures located in the proximity of the rear large cylindrical surface portion and spaced from each other of the order of 3-4 mm, in order to ensure a reliable positioning of the two parts 44a and 44b.

The fiber holding unit 44 is preferably made of a flexible material, such as polyester imide. In the case of an optical fiber of the polymer clad type, for example, having a 230 $\mu$m outer diameter, the fiber holding unit 44 may be 15 mm in overall length and may have a rear large cylindrical portion 48 of 2.6 mm in outer diameter, a small cylindrical portion 34 of 1.0 mm in outer diameter and a tapered portion 50 of 4° in taper angle and hemispherical spacers 56 of 0.13 mm in radius. Dowels, if provided, may be 0.4 mm in diameter and 0.7 mm in length.

Finally, the optical connector comprises a rear body 64 which is similar to the rear body 20 of the prior art shown in FIG. 6d and has an external thread 66 at its front end.

The assembling operation of the optical fiber connector described above will be explained in detail hereinafter.

1. Provisional assembling

The "provisional assembling" used herein means that the respective components of the optical fiber connector according to the invention are assembled into the state shown in FIG. 2. In more detail, the fiber holding unit 44 is arranged in the front body 30 and the rear body 64 is then slightly threadedly engaged with the rear end of the front body 30 to complete the provisional assembling.

FIGS. 3a and 3b illustrate the state of the fiber holding unit 44 in the provisionally assembled. The mating surfaces 51 of the parts 44a and 44b are slightly spaced without contacting each other owing to the spacers 56 and 58. Therefore, the space between the V-shaped grooves 52 of the parts 44a and 44b is sufficient to allow an optical fiber 28 to pass therethrough.

2. Assembling

Figure 5A:
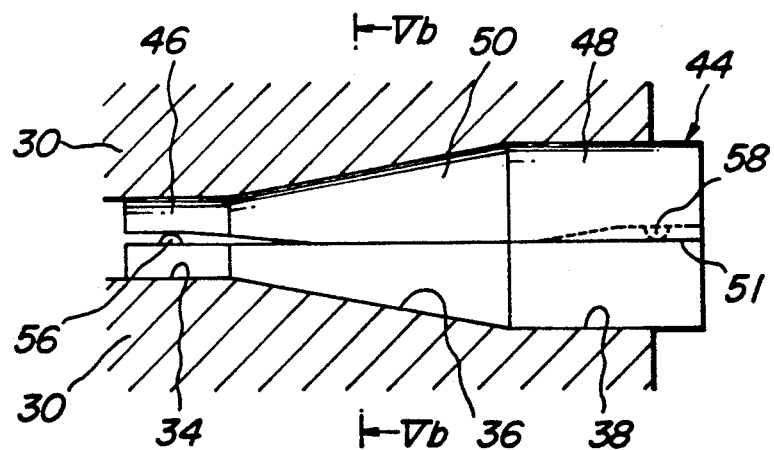
FIG. 5a is an enlarged explanatory view illustrating the fiber holding unit shown in FIG. 4.
Figure 5B:
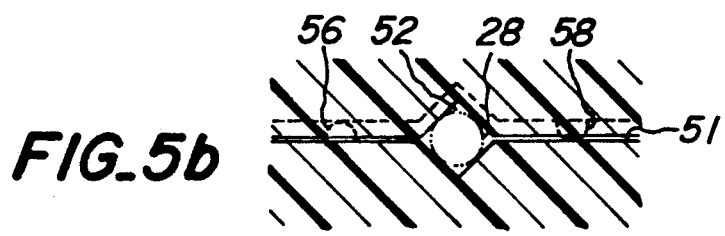

An optical fiber cord 22 including an optical fiber 28 whose front end is exposed from its sheath is inserted into the connector provisionally assembled from the rear end as shown in FIG. 4. The rear body 64 threadedly engaged with the rear end of the front body 30 is then further screwed thereinto to force the fiber holding unit 44 into the front body 30. The fiber holding unit 44 forced into the front body in this manner is shown in FIGS. 5a and 5b. When the fiber holding unit 44 is forced forward into the front body 30, the parts 44a and 44b of the fiber holding unit 44 is generally subjected to radially inward forces owing to a wedge effect resulting from the tapered surfaces 36 and 50 of the front body 30 and the parts 44a and 44b.

However, the cylindrical portions 46 and 48 of the parts 44a and 44b formed with the spacers 56 and 58 are not subjected to any radially inward force because they are cylindrical. Consequently, the mating surfaces 51 in the proximity of the spacers 56 and 58 are kept spaced from each other. On the other hand, the mating surfaces 51 corresponding to the tapered surfaces 50 are brought into contact with each other by the wedge effect resulting from the tapered surfaces in conjunction with the elastic deformation of the parts 44a and 44b made of the flexible material. As a result, the fiber holding unit 44 is partially deformed to securely clamp the optical fiber 28 in the V-shaped grooves 52 in the fiber holding unit 44.

As can been seen from the above explanation, with the optical connector according to the invention the respective parts can be maintained in the provisionally assembled state during shipment an in storage so that they can be handled simply and easily without any risk of loss of parts. In finally assembling the optical connector, an operator simply inserts an optical fiber into the provisionally assembled optical connector and tightly clamp it by means of the rear body. Therefore, the assembling operation is very simple and rapidly effected. It is particularly effective for assembling the optical connector at the site where it is used. Moreover, the number of parts is less so that the optical connector according to the invention is inexpensive to manufacture and easy to assemble.

While the invention has been particularly shown and described with reference to preferred embodiment thereof, it will be understood by those skilled in the art that the foregoing and other changes in form and details can be made therein without departing from the spirit and scope of the invention.

What is claimed is;

1. An optical connector comprising a generally cylindrical front body having inner surfaces partially tapered, a fiber holding unit made of a flexible material consisting of two parts whose mating surfaces are formed along their centers with grooves for holding an optical fiber and formed at front and rear portions with spacers for partially preventing intimate contact between the mating surfaces in the proximity of the spacers, the two assembled parts of the fiber holding unit forming cylindrical outer surfaces at front and rear ends and a tapered outer surface between the cylindrical outer surfaces so that the two assembled parts with the optical fiber interposed therebetween are able to be fitted in the front body, and a rear body having a front end to be threadedly engaged in the rear part of the inner surface of the front body to urge forwardly the two assembled parts inserted into the front body, thereby clamping the optical fiber between the parts of the fiber holding unit by a wedge effect owing to the tapered surfaces of the front body and the fiber holding unit.

2. The optical connector as set forth in claim 1, wherein the inner surfaces of said front body are formed by a front cylindrical bore, a tapered bore, and an enlarged cylindrical bore, and the rear part of the inner surface of the front body is formed by an internally threaded bore.

3. The optical fiber as set forth in claim 1, wherein each of said grooves for holding the optical fiber is composed of a V-shaped groove for receiving the front end of the optical fiber and a groove for receiving a sheath of the optical fiber.

4. The optical fiber as set forth in claim 1, wherein the fiber holding unit is made of polyester imide.

5. The optical fiber as set forth in claim 1, wherein the spacers of the fiber holding unit are hemispherical projections.

6. The optical fiber as set forth in claim 1, wherein the spacers of the fiber holding unit are provided only on one of the two parts.

7. The optical fiber as set forth in claim 1, wherein the mating surfaces of the two parts of the fiber holding unit are provided with positioning means comprising dowels and dowel apertures.

* * * * *

UNITED STATES PATENT AND TRADEMARK OFFICE
CERTIFICATE OF CORRECTION

PATENT NO. : 5,185,837
DATED : February 9, 1993
INVENTOR(S) : Tokuichi Ayuta, Shiego Takahashi and Takao Hirose It is certified that error appears in the above-identified patent and that said Letters Patent is hereby corrected as shown below:

Column 2, line 27, "it" should be --its--;

Column 4, line 60, "an" should be --and--;

Column 5, line 5, "embodiment" should be --embodiments--.

Signed and Sealed this

Thirtieth Day of November, 1993

Attest:

BRUCE LEHMAN

Attesting Officer

Commissioner of Patents and Trademarks